US011985067B2

(12) United States Patent
Alleyne et al.

(10) Patent No.: US 11,985,067 B2
(45) Date of Patent: May 14, 2024

(54) FLOWLET SWITCHING USING MEMORY INSTRUCTIONS

(71) Applicant: NOKIA SOLUTIONS AND NETWORKS OY, Espoo (FI)

(72) Inventors: Brian Alleyne, Los Gatos, CA (US); Mimi Dannhardt, Vienna, VA (US); Evan Gewirtz, Pleasanton, CA (US); Hengwei Hsu, Fremont, CA (US); Alexander Shechter, Rancho Palos Verdes, CA (US); Sakthi Subramanian, San Jose, CA (US); Mohamed Abdul Malick Mohamed Usman, Fremont, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 159 days.

(21) Appl. No.: 17/548,456

(22) Filed: Dec. 10, 2021

(65) Prior Publication Data
US 2023/0188468 A1 Jun. 15, 2023

(51) Int. Cl.
*H04L 47/125* (2022.01)
*H04L 47/28* (2022.01)
*H04L 49/103* (2022.01)

(52) U.S. Cl.
CPC ............ *H04L 47/125* (2013.01); *H04L 47/28* (2013.01); *H04L 49/103* (2013.01)

(58) Field of Classification Search
CPC ....... H04L 47/125; H04L 47/28; H04L 47/41; H04L 49/103; H04L 45/24
See application file for complete search history.

(56) References Cited

U.S. PATENT DOCUMENTS 10,057,174 B2 * 8/2018 Vaidya .................... H04L 45/38
10,218,629 B1 2/2019 An et al.
(Continued)

OTHER PUBLICATIONS

Ye, Jin-Li, et al., "A Weighted ECMP Load Balancing Scheme for Data Centers Using P4 Switches," 2018 IEEE 7th International Conference on Cloud Networking (CLOUDNET), XP033457677, Oct. 22, 2018, p. 1-4.
(Continued)

*Primary Examiner* — Chi H Pham
*Assistant Examiner* — Vladislav Y Agureyev
(74) *Attorney, Agent, or Firm* — Tong, Rea, Bentley & Kim, LLC

(57) ABSTRACT

Systems and methods for flowlet switching using memory instructions. One embodiment is a method of distributing packets over multiple paths. The method includes determining an elapsed time between a packet and a previous packet. The method further includes, in response to determining that the elapsed time is less than an inter-packet gap threshold: retaining a previously selected path value indicated in the flow record, and providing the previously selected path value to the processing thread for transmitting the packet over a previously selected path associated with the previous packet. The method also further includes, in response to determining that the elapsed time is greater than the inter-packet gap threshold: updating the flow record by replacing the previously selected path value with the path value of the selected path of the memory instruction, and providing the path value to the processing thread for transmitting the packet over the selected path.

25 Claims, 3 Drawing Sheets

(56) References Cited

U.S. PATENT DOCUMENTS

| | | | |
|---|---|---|---|
| 10,355,981 B1* | 7/2019 | Matthews | H04L 47/6215 |
| 2016/0337196 A1* | 11/2016 | Zhang | H04L 47/781 |
| 2017/0085485 A1* | 3/2017 | Vanini | H04L 47/822 |
| 2017/0207976 A1* | 7/2017 | Rovner | H04L 43/16 |
| 2017/0279723 A1* | 9/2017 | Vedam | H04L 43/12 |
| 2018/0041470 A1* | 2/2018 | Schultz | H04L 63/0263 |
| 2018/0063018 A1* | 3/2018 | Bosch | H04L 47/822 |
| 2018/0159779 A1* | 6/2018 | Williams, Jr. | H04L 47/20 |
| 2018/0167307 A1* | 6/2018 | Barry | H04L 45/7452 |
| 2019/0150150 A1* | 5/2019 | Calin | H04W 72/0453 |
| | | | 370/329 |
| 2019/0199647 A1* | 6/2019 | Gupta | H04L 45/74 |
| 2019/0372906 A1* | 12/2019 | Baldi | H04L 47/70 |
| 2021/0119930 A1* | 4/2021 | Debbage | H04L 1/1642 |
| 2021/0399941 A1* | 12/2021 | Fang | H04L 45/24 |
| 2022/0086080 A1* | 3/2022 | Huang | H04L 47/2483 |
| 2022/0166722 A1* | 5/2022 | Dave | H04L 69/22 |
| 2022/0200923 A1* | 6/2022 | Bataineh | H04L 47/24 |
| 2022/0393968 A1* | 12/2022 | Amend | H04L 47/10 |

OTHER PUBLICATIONS

EP Search Report mailed in counterpart EP Patent Application No. 22212098.2 dated Apr. 6, 2023, 9 pages.

* cited by examiner

FLOWLET SWITCHING USING MEMORY INSTRUCTIONS

FIELD

The disclosure generally relates to communication networks and, more particularly, to flowlet switching in networks having multiple paths.

BACKGROUND

A network switch may receive and transmit data packets via multiple ports. Accordingly, there may be more than one possible network path or link via which a packet can be transmitted to forward the data packet to its destination. In such multipath networks, packets belonging to the same flow may undesirably arrive out of order if communicated over alternate paths. Additionally, traffic may not be distributed evenly among the paths, which may result in congestion on one data path and unused bandwidth on another, causing network inefficiency and increased packet latency.

Various load balancing techniques are known which dynamically distribute traffic across multiple paths. On such technique, known as flowlet switching, is effective at dynamically splitting and rerouting traffic over multiple paths without causing packets to arrive out of order at their destination. However, conventional flowlet switching implementations use a significant amount of processing resources.

SUMMARY

Embodiments herein provide flowlet switching using memory instructions. A processing thread offloads the task of determining, for each packet, whether the packet is to be transmitted over the same path as a preceding packet, or instead transmitted over a new path. In particular, this task is offloaded to a memory controller using a special memory operation that executes on a flow record. The memory operation enables the memory controller to determine whether enough idle time has passed between a preceding packet and a current packet such that the current packet may be transmitted over a new path without causing it to arrive at its destination out of order. Advantageously, by offloading this task to the memory controller, the processing thread is freed up to perform other tasks to improve response time and optimize processing resources.

One embodiment is a method of distributing packets over multiple paths. The method includes receiving a packet at a processing thread, performing a lookup function for the packet to determine a selected path among the plurality of paths to which the packet is to be transmitted, performing a hash function for the packet to determine a flow record address for the packet, and issuing a memory instruction to a memory controller, the memory instruction including the flow record address and a path value indicating the selected path. The method also includes obtaining a current time associated with the packet, accessing a flow record according to the flow record address to retrieve a timestamp of a previous packet, and determining an elapsed time between the packet and the previous packet based on a difference between the current time and the timestamp.

The method further includes, in response to determining that the elapsed time is less than an inter-packet gap threshold: retaining a previously selected path value indicated in the flow record, and providing the previously selected path value to the processing thread for transmitting the packet over a previously selected path associated with the previous packet. The method also further includes, in response to determining that the elapsed time is greater than the inter-packet gap threshold: updating the flow record by replacing the previously selected path value with the path value of the selected path of the memory instruction, and providing the path value to the processing thread for transmitting the packet over the selected path.

In a further embodiment, the method includes executing an atomic memory operation at the flow record address to determine the elapsed time and to update the flow record in a single operation. In yet a further embodiment, the atomic memory operation is invoked with content of the memory instruction including the flow address record, the selected path, and the inter-packet gap threshold. In another further embodiment, the method includes obtaining the current time associated with the packet in response to receiving the memory instruction at a memory controller. In yet another further embodiment, the method includes selecting the inter-packet gap threshold based on a network application, wherein the network application includes one of a fabric switch, link aggregation (LAG), and equal cost multipath (ECMP).

Another embodiment is a network device operable to distribute traffic data over a plurality of paths. The network device includes a processing thread configured to receive a packet, to perform a lookup function for the packet to determine a selected path among the plurality of paths to which the packet is to be transmitted, to perform a hash function for the packet to determine a flow record address for the packet, and to issue a memory instruction that includes the flow record address and a path value indicating the selected path. The network device also includes a memory controller configured to receive the memory instruction, to obtain a current time associated with the packet, to access a flow record according to the flow record address to retrieve a timestamp of a previous packet, and to determine an elapsed time between the packet and the previous packet based on a difference between the current time and the timestamp. The memory controller is further configured, in response to determining that the elapsed time is less than an inter-packet gap threshold, to retain a previously selected path value indicated in the flow record, and to provide the previously selected path value to the processing thread for transmitting the packet over a previously selected path associated with the previous packet. The memory controller is also further configured, in response to determining that the elapsed time is greater than the inter-packet gap threshold, to update the flow record by replacing the previously selected path value with the path value of the selected path of the memory instruction, and to provide the path value to the processing thread for transmitting the packet over the selected path.

The various embodiments disclosed herein may be implemented in a variety of ways as a matter of design choice. For example, the embodiments may take the form of computer hardware, software, firmware, or combinations thereof. Other example embodiments are described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
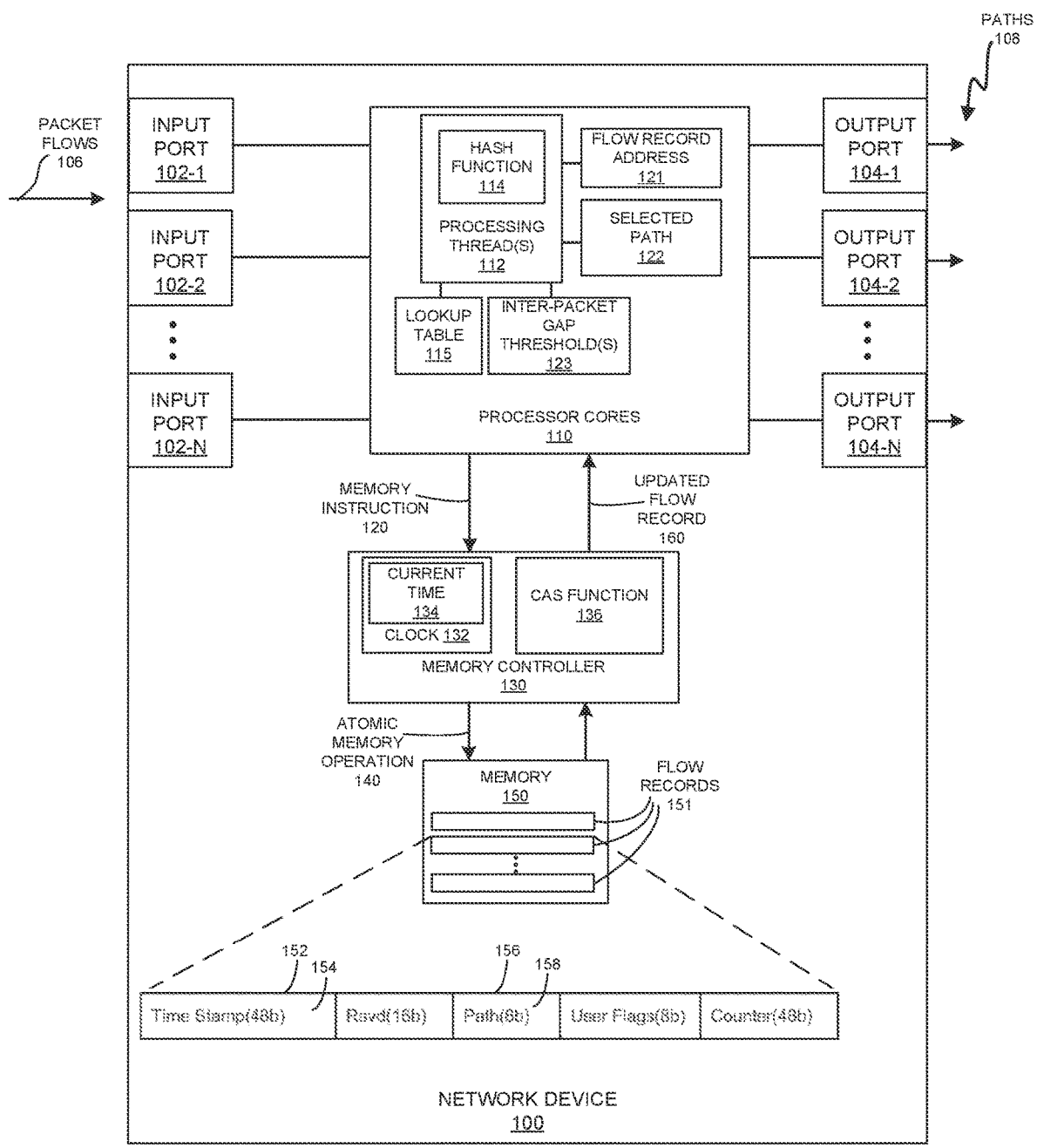
FIG. 1 is a block diagram of an example network device for distributing packets over multiple paths in an illustrative embodiment.

FIG. 1 is a block diagram of an example network device 100 for distributing packets over multiple paths in an illustrative embodiment. The network device 100 includes one or more input ports 102 and a plurality of output ports 104. Incoming packet flows 106 may be received at the input ports 102 and sent to one or more processor cores 110 configured to perform various packet processing tasks. A packet flow 106 is a sequence of packets sent from a source device to a destination. Each packet may be associated with a particular flow that is defined by one or more common values of packet header fields. For example, each packet flow 106 may be uniquely identified by a source Internet Protocol (IP) address, a destination IP address, a source port, a destination port, and/or transport protocol.

Generally, the network device 100 is configured to load balance the packet flows 106 across multiple paths 108 of a network. Accordingly, some of the packets may transmit over one path, while other packets transmit over one or more alternate paths. This allows the network device 100 to take better advantage of the potential bandwidth for transmitting packets to their destination. Generally, flow-based splitting pins each flow to a specific path and thus avoids packet reordering. However, in situations of sudden congestion caused by link failures or traffic spikes, flow-based splitting may assign inaccurate amounts of traffic to each path or fail to quickly redistribute the amount of traffic on each path.

One technique for accurately splitting traffic across multiple paths 108 is known as flowlet switching. A flowlet is a burst of packets of a same flow that are separated by certain amount of time from other bursts of packets of the same flow. In particular, if an idle time between consecutive flowlets is larger than a worst case latency across any path under consideration, then the consecutive flowlets can be switched independently onto different paths with no risk of packet reordering. Flowlet switching thus dynamically distributes data while minimizing path oscillation, resulting in efficient utilization of the network and fast data transmission rates. Unfortunately, previous flowlet switching implementations burden the processor core/thread that could otherwise be used to perform other packeting processing tasks.

The network device 100 is therefore enhanced with an implementation that performs flowlet switching efficiently and accurately without burdening the processor core 110 or processing threads 112. In particular, for each packet, a processing thread 112 issues a memory instruction 120 to a memory controller 130. The memory controller 130 is configured to use the content of memory instructions 120 to determine whether a new path may be chosen on a packet-by-packet basis. Advantageously, by offloading flowlet switching determinations to the memory controller 130, processing threads 112 of the processor core 110 are freed up to perform other packet processing tasks. Additionally, since the memory controller 130 and memory 150 form a centralized memory architecture with a physically close/short connection path, each decision/operation can be performed in one or two clock cycles to achieve flowlet switching processing with low latency and high performance.

For each packet, the assigned processing thread 112 generates a memory instruction 120 formatted with fields including a flow record address 121 and a selected path 122. In some embodiments, the memory instruction 120 also includes an inter-packet gap threshold 123. The processing thread 112 may determine the flow record address 121 by executing a hash function 114 that indexes flow records 151 stored in memory 150. Additionally, the processing thread 112 may determine the selected path 122 based at least in part on a lookup table 115. The selected path 122 is a path among the multiple paths 108 that is requested by the processing thread 112 for transmitting the packet. For example, the selected path 122 may represent a path that is selected for load balancing.

The inter-packet gap threshold 123 is generally set to, or at least based on, a worst case latency of the multiple paths 108 that are candidates for transmitting the packet. That is, if a time between two arriving packet is larger than the worst case latency (or inter-packet gap threshold 123), then the second packet may be transmitted on a new path without risk of it arriving at its destination out of order. The second packet may thus be switched onto a new path that is different than the path of the first packet. By contrast, if the time between two arriving packet is less than the worst case latency (or inter-packet gap threshold 123), then there is a risk that the second packet may arrive at the destination before the first packet. In that case it is desirable for the second packet to be transmitted on the same path as the first packet. The inter-packet gap threshold 123 may be determined by measurements or experimentation of the multiple paths 108 and stored in a local memory of the processor core 110. Alternatively, in some embodiments, the inter-packet gap threshold 123 is stored in memory 150 for retrieval by the memory controller 130.

To support flowlet switching, the memory controller 130 maintains a set of flow records 151 stored in memory 150. Each flow record 151 includes fields of metadata that describe an active packet flow. The fields may be updated on a packet-by-packet basis. FIG. 1 shows an example format of a flow record 151 including a timestamp field 152 having a timestamp value 154 and a path field 156 having a path value 158. The memory controller 130 includes a clock 132 configured to provide a current time 134 that corresponds with a time of receiving a current packet. The memory controller 130 is configured to determine an elapsed time between two consecutive packets based on the difference between the current time 134 and the timestamp value 154. By comparing the elapsed time with the inter-packet gap threshold 123, the memory controller 130 is configured to determine whether to switch the packet onto a new path and thus implement flowlet switching decisions on behalf of the processing threads 112.

More particularly, in one embodiment, the memory controller 130 includes a compare-and-swap (CAS) function 136 configured to execute an atomic memory operation 140 on a flow record 151. This implements a hardware-based atomic primitive to perform a read-modify-write operation that reads a memory location and writes a new value into it simultaneously. That is, at the flow record 151 corresponding with the flow record address 121 indicated in the memory instruction 120, the CAS function 136 compares the determined elapsed time between packets with the inter-packet gap threshold 123. If the elapsed time is larger than the inter-packet gap threshold 123, the CAS function 136 overwrites the path value 158 with the selected path 122 indicated in the memory instruction 120. Otherwise, if the elapsed time is smaller than the inter-packet gap threshold 123, the CAS function 136 does not update the path field 156. Additionally, the CAS function 136 also overwrites the timestamp value 154 with the current time 134. In doing so, the atomic primitive enables tracking of inter-packet time.

After updating one or more fields of the flow record 151, the memory controller 130 provides an updated flow record 160 or portion thereof to the processing thread 112. If the path field 156 has been updated to indicate the selected path 122, the processing thread 112 receives permission to transmit the packet over the selected path 122 for load balancing. Otherwise, if the path field 156 has not been updated with the selected path 122, the processing thread 122 is denied permission to use the selected path 122 due to risk of arriving out of order. That is, a non-updated path value 158 instructs the processing thread 112 to transmit the packet over the same path as the preceding packet(s) to avoid reordering.

Since each operation updates the timestamp field 152 (corresponding with a previous packet) with the current time 134 (corresponding with a current packet), a subsequent operation performed for a subsequent packet may similarly use the timestamp value 154 for flowlet switching determination. The atomic memory operation 140 and CAS function 136 thus enable the memory controller 130 to update one or more fields of a flow record 151 to track the packet flow 108 on a packet-by-packet basis for flowlet switching. Advantageously, since the atomic memory operation 140 performs the whole operation for one request at one time, a subsequent command coming from a different processing thread 112 does not interfere.

Functions of the network device 100 may be applicable to multiple types of multipath networks or fabrics. For example, the multiple paths 108 may includes a series of links between routers used to transmit a packet from a source device to a destination device or may include a series of links within an individual router or fabric switch device. Thus, in the case of the network device 100 selecting paths for a multipath router network, the flow records 151 may comprise next-hop entries associated with routers. A "hop," as used herein, may generally refer to the portion of a path or link extending between two routers. Thus, functions described herein may be used to select paths on a per-hop basis or end-to-end route extending from the source location to the destination location.

In some implementations, the network device 100 may combine one or more paths to form a link aggregation group (LAG) providing a single high-bandwidth data path between devices. The flow records 151 may thus comprise entries derived from a LAG table. The network device 100 may be included in a network such as a fabric switch network, a local area network (LAN), a wide area network (WAN) such as the Internet, a wireless network, a cloud network, and/or the like.

Figure 2:
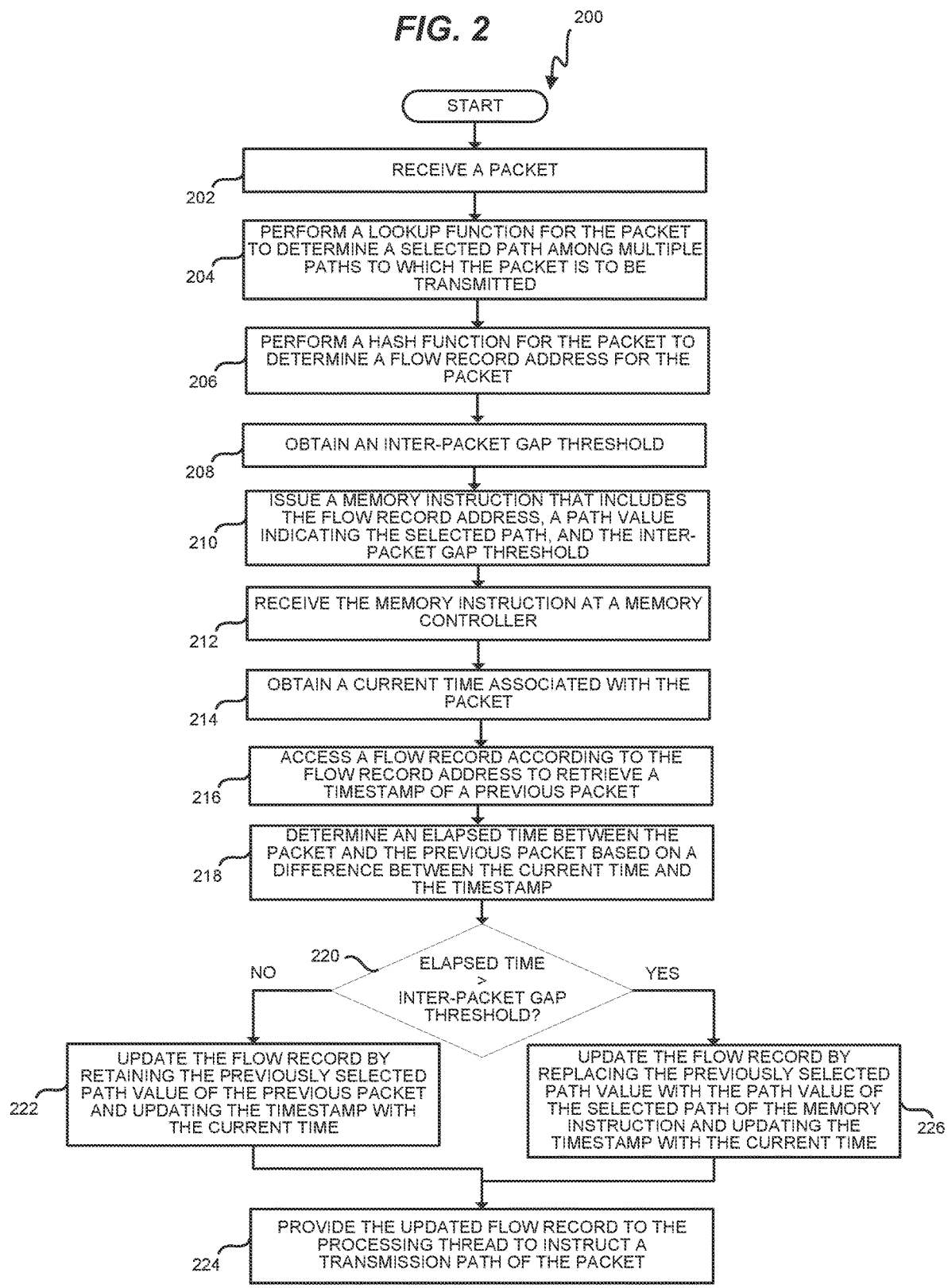
FIG. 2 is a flowchart illustrating a method of distributing packets over multiple paths in an illustrative embodiment.

FIG. 2 is a flowchart illustrating a method 200 of distributing packets over multiple paths in an illustrative embodiment. The steps of method 200 are described with reference to the network device 100 of FIG. 1, but those skilled in the art will appreciate that the method 200 may be performed in other devices and systems. The steps of the flowcharts described herein are not all inclusive, may include other steps not shown, and may also be optionally performed in an alternative order.

In step 202, a processing thread 112 receives a packet. For example, as new packets arrive, a processing thread 112 of the processing core 110 detects the packets in a receive buffer of an input ports 102 and reads the packets' header into its register. The packet header may thus be stored for processing while the remainder of the packet is temporarily stored in a cache memory.

In step 204, the processing thread 112 performs a lookup function for the packet to determine a selected path 122 among multiple paths 108 to which the packet is to be transmitted. For example, the processing thread 112 may decide which of the output ports 104 to send the packet based on a destination address located in a header of the packet and based on an entry in a lookup table 115 for that destination address. Alternatively or additionally, the processing thread 112 may select a path according to various loading balancing schemes such as randomly or based on path bandwidth measurements. For example, the processing thread 112 may use a byte fair round robin mechanism for multicast packets or a weighted round robin mechanism for unicast packets. Such mechanisms may be based on bandwidth utilization of paths expressed on a scale (e.g., using seven bits) and obtained via background processing thread (s) 112 that periodically scan output links.

In step 206, the processing thread 112 performs a hash function 114 for the packet to determine a flow record address 121 for the packet. The hash function 114 is configured to index a large set of flow records 151 based on one or more header fields. For example a flow record 151 may be indexed by a source IP address, a destination IP address, a source port, a destination port, and/or transport protocol. In some embodiments, the network device 100 may aggregate packet flows into meta-flows to manage the number of indexed entries. A meta-flow is thus a collection of flows having the same hash value. After calculating a hash value based on packet header fields, a select set of bits from the hash value may be used to derive the index, or flow record address 121, of a meta-flow record in the meta-flow table corresponding with the packet.

In step 208, the processing thread 112 obtains an inter-packet gap threshold 123. The inter-packet gap threshold 123 may be determined based on a maximum latency between the candidate paths (including processing, queuing, and propagation delays through the fabric or network). In some embodiments, the processing thread 112 selects from a plurality of inter-packet gap thresholds 123 based on an application of the packet, type of networking device, and/or type of network. For example, the inter-packet gap threshold 123 may vary based on whether the flowlet switching is performed for an internal application such as between line cards of a fabric switch or an external application such as a router connected to destination nodes using link aggregation (LAG) or equal cost multipath (ECMP). The inter-packet gap threshold 123 may thus comprise an application-dependent value that is retrieved accordingly.

In step 210, the processing thread 112 issues a memory instruction 120 that includes the flow record address 121, a path value indicating the selected path 112, and the inter-packet gap threshold 123. In step 212, the memory controller 130 receives the memory instruction 120. In one embodiment, the atomic memory operation 140 is invoked with the flow address record 121, selected path 122, and inter-packet gap threshold 123. In another embodiment, the memory controller 130 obtains the inter-packet gap threshold 123 stored in memory 150 or as a memory configuration instead of via memory instruction 120.

In step 214, the memory controller 130 obtains a current time 134 associated with the packet. For example the memory controller 130 may trigger a snapshot of the current time 134 from the clock 132 in response to receiving or detecting the memory instruction 120. In step 216, the memory controller 130 accesses a flow record 151 in memory 150 according to the flow record address 121 to retrieve a timestamp 154 of a previous packet. In step 218, the memory controller 130 determines an elapsed time between the packet and the previous packet based on a difference between the current time 134 and the timestamp 154.

In step 220, the memory controller 130 determines whether the elapsed time is greater than the inter-packet gap threshold 123. If the elapsed time is less than inter-packet gap threshold 123 (no in step 220), the method 200 proceeds to step 222 and the memory controller 130 updates the flow record address 121 by retaining a previously selected path value of the previous packet, and updating the timestamp field 152 with the current time 134 (i.e., replaces the previous timestamp value 154). In other words, only the timestamp field 152 is updated and the path field 156 is not updated such that the path field value 158 is unchanged from a previous iteration. Then, in step 224, the memory controller 130 provides the updated flow record (having the previously selected path value) to the processing thread 112 to instruct the transmission path of the packet. Thus, if the inter-packet gap threshold 123 is not exceeded, the packet is transmitted over the same path that is unchanged from preceding packet(s) of the packet flow.

Otherwise, if the elapsed time is greater than inter-packet gap threshold 123 (yes in step 220), the method 200 proceeds to step 226 and the memory controller 130 updates the flow record address 121 by replacing the previously selected path value with the path value of the selected path 122, and also updating the timestamp field 152 with the current time 134 (i.e., replaces the previous timestamp value 154). In other words, both the path field 156 and the timestamp field 152 are updated. Then, in step 224, the memory controller 130 provides the updated flow record (indicating the selected path 122) to the processing thread 112 to instruct the transmission path of the packet. Thus, if the inter-packet gap threshold 123 is exceeded, the packet is transmitted over the selected path 122 that may be different from the path of preceding packet(s) of the packet flow.

In one embodiment, the memory controller 130 provides the updated flow record 160 in its entirety to the processing thread 112. Thus, in addition to the timestamp field 152 and path field 156, other fields may be returned such as a reserved field, a user flags field, and a counter field. In an alternative embodiment, the memory controller 130 may provide a portion of a flow record 151 such as the path field 156 indicating whether to switch paths. The steps of method 200 may repeat for each packet to implement flowlet switching on a packet-by-packet basis. Additionally, one or more of steps 216-226 may be implemented via the CAS function 136 and atomic memory operation 140. Thus, processing threads 112 processing packets of the same packet flow or same meta-flow do not interfere with one another. In addition to enabling inter-packet time tracking using memory instructions, this advantageously offloads flowlet switching to a centralized memory controller so that processing threads 112 can perform other packet processing tasks.

Figure 3:
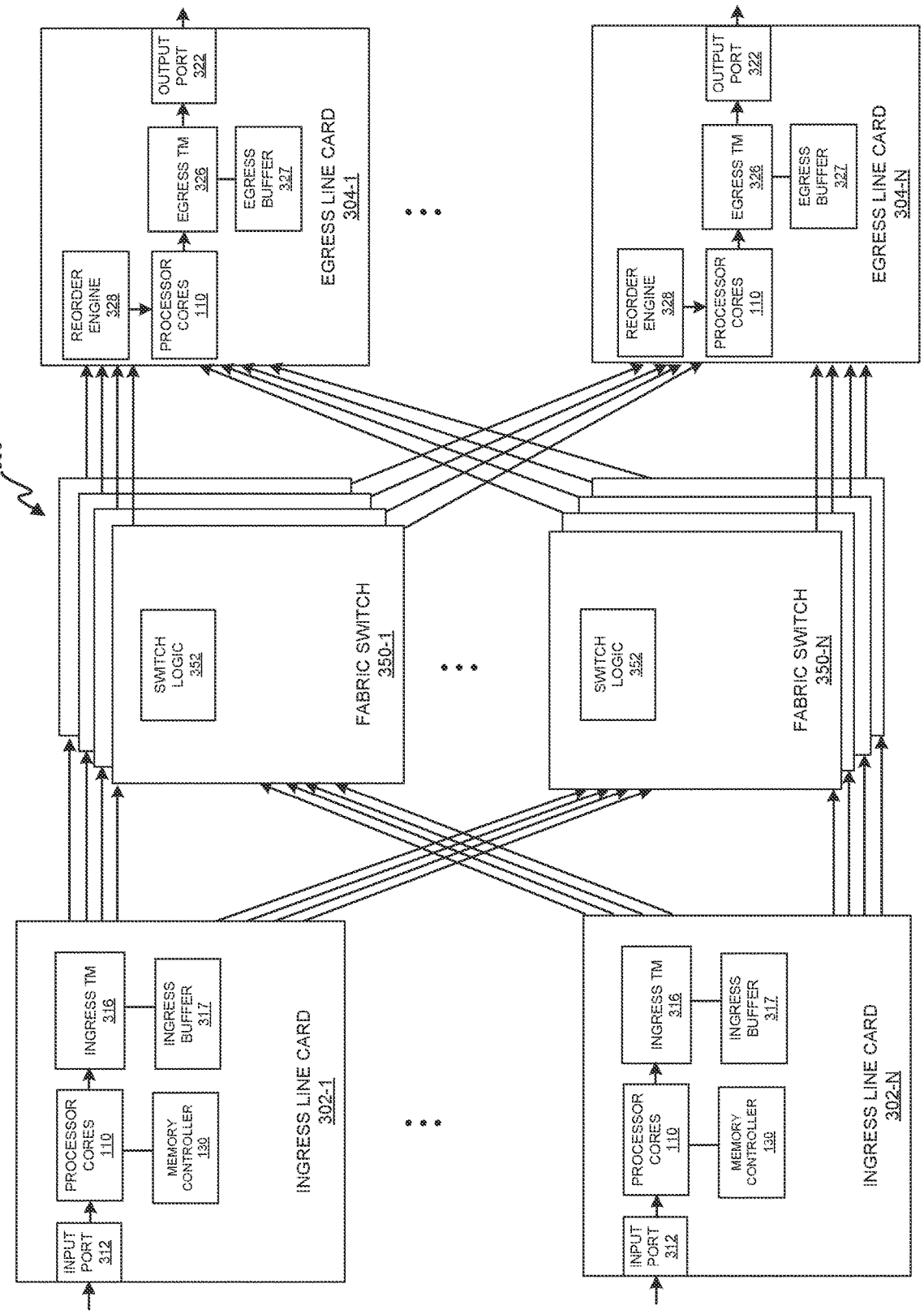
FIG. 3 is a block diagram of an example network device for distributing packets over multiple paths in another illustrative embodiment.

FIG. 3 is a block diagram of an example network device 300 for distributing packets over multiple paths in another illustrative embodiment. The network device 300 may comprise a chassis switching device or router including a set of fabric switches 350 connecting a set of line cards together. In particular, FIG. 3 shows a plurality of ingress line cards 302 and a plurality of egress line cards 304, although a single line card can include both source and destination line card functionality. Additionally, a line card 302-304 and fabric switch 350 may include the same integrated circuits configured to perform respective functions.

Each line card 302-304 may include multiple fabric ports to the fabric switches 350 creating a plurality of possible paths across the fabric. In particular, each ingress line card 302 includes one or more input ports 312 configured to couple with a corresponding source device. Additionally, at the fabric side, each ingress line card 302 includes multiple fabric ports (represented by line arrows) coupled with corresponding fabric switches 350. Each fabric port may correspond with an ingress traffic manager 316 and ingress buffer 317, though a single set is shown in FIG. 1 for ease of illustration.

Similarly, each egress line card 304 includes multiple fabric ports (represented by line arrows) coupled with corresponding fabric switches 350, and includes one or more output ports 322 configured to couple with a corresponding destination device. Each output port 322 may correspond with an egress traffic manager 326 and egress buffer 327. The traffic managers 316/326 are configured to perform scheduling and buffering functions for outgoing packets while meeting Quality of Service (QoS) demands. Each egress line card 304 may also include a reorder engine 328 to reorder packets transmitted over the multiple fabric paths provided in the network device 300.

Moreover, each ingress line card 302 includes the processor core 110 and memory controller 130 having a flowlet switching implementation previously described. The network device 300 thus advantageously optimizes processing resources for improved response times as compared to flowlet switching implementations that do not offload fabric path determination to the memory controller 130. Processor cores 110 of the line cards 302-304 may perform tasks such as parsing packets received from the input ports 312, applying rules or policies to packets (e.g., traffic flow control, traffic shaping, security, etc.), locating forwarding information for packets, discarding packets, and/or determining which output ports to transmit packets. Each line card 302-304 may include multiple processor cores 110 to perform parallel processing for packets. As previously described, each processor core 110 may include a set of threads, or executable units, connected to link-layer interfaces and the packet buffer, as well as dedicated registers providing layer one (L1) caches. The threads are logical constructs of the processor core 110 that may be allocated to particular processing tasks.

Functions of the memory controller 130 and/or processor core 110 may be implemented with a processor coupled with memory. The processor may be embodied as any type of processor capable of performing the functions described herein. Similarly, the memory may be embodied as any type of volatile or non-volatile memory or data storage capable of supporting the functions described herein. For example, the memory controller 130 may include the processor embodied as a single or multi-core processor(s), digital signal processor, microcontroller, or other processor or processing/controlling circuit.

In operation, the memory may store various data and programming used during operation of the network device 100/300, such as operating systems, applications, programs, libraries, and drivers. The memory may be communicatively coupled to the processor via an I/O subsystem, which may be embodied as circuitry and/or components to guides, printed circuit board traces, etc. and/or other components and subsystems to facilitate the input/output operations. Additionally, the network device 100/300 may be embodied as any type of networking device capable of performing the functions described herein including a network router (e.g., layer three (L3) enabled device), or layer two (L2) network devices such as an intelligent switch, hub, or other network device.

What is claimed is:

1. A method of distributing packets over multiple paths, the method comprising:
    receiving a packet at a processing thread;
    performing a lookup function for the packet to determine a selected path among the plurality of paths to which the packet is to be transmitted;
    performing a hash function for the packet to determine a flow record address for the packet;
    issuing a memory instruction to a memory controller, the memory instruction including the flow record address and a path value indicating the selected path;
    obtaining a current time associated with the packet;
    accessing a flow record according to the flow record address to retrieve a timestamp of a previous packet;
    determining an elapsed time between the packet and the previous packet based on a difference between the current time and the timestamp; and
    determining, based on a comparison of the elapsed time and an inter-packet gap threshold, whether to transmit the packet over the selected path or a previously selected path associated with the previous packet.

2. The method of claim 1, further comprising:
    obtaining the current time associated with the packet in response to receiving the memory instruction at a memory controller.

3. The method of claim 1, wherein:
    the memory instruction further includes the inter-packet gap threshold.

4. The method of claim 1, wherein:
    the inter-packet gap threshold is based on a maximum latency between the multiple paths.

5. The method of claim 1, further comprising:
    selecting the inter-packet gap threshold based on a network application, wherein the network application includes one of a fabric switch, link aggregation (LAG), and equal cost multipath (ECMP).

6. The method of claim 1, further comprising:
    determining the selected path based at least in part on bandwidth utilization of the multiple paths.

7. The method of claim 1, further comprising:
    in response to determining that the elapsed time is less than the inter-packet gap threshold:
        retaining, in the flow record, a previously selected path value indicative of the previously selected path; and
        providing the previously selected path value to the processing thread for transmitting the packet over the previously selected path associated with the previous packet.

8. The method of claim 1, further comprising:
    in response to determining that the elapsed time is greater than the inter-packet gap threshold:
        updating the flow record by replacing the previously selected path value with the path value of the selected path of the memory instruction; and
        providing the path value of the selected path to the processing thread for transmitting the packet over the selected path.

9. The method of claim 8, further comprising:
    executing an atomic memory operation at the flow record address to determine the elapsed time and to update the flow record in a single operation.

10. The method of claim 9, wherein:
    the atomic memory operation is invoked with content of the memory instruction including the flow address record, the selected path, and the inter-packet gap threshold.

11. The method of claim 8, further comprising:
    updating the flow record by changing the timestamp to the current time.

12. The method of claim 11, further comprising:
    providing an updated flow record to the processing thread, wherein a path field of the updated flow record instructs the processing thread whether to use the selected path for transmitting the packet.

13. A network device operable to distribute traffic data over a plurality of paths, the network device comprising:
    a processing thread configured to receive a packet, to perform a lookup function for the packet to determine a selected path among the plurality of paths to which the packet is to be transmitted, to perform a hash function for the packet to determine a flow record address for the packet, and to issue a memory instruction that includes the flow record address and a path value indicating the selected path; and
    a memory controller configured to receive the memory instruction, to obtain a current time associated with the packet, to access a flow record according to the flow record address to retrieve a timestamp of a previous packet, and to determine an elapsed time between the packet and the previous packet based on a difference between the current time and the timestamp,
    the memory control further configured to determine, based on a comparison of the elapsed time and an inter-packet gap threshold, whether to transmit the packet over the selected path or a previously selected path associated with the previous packet.

14. The network device of claim 13, wherein:
    the memory controller further configured to obtain the current time associated with the packet in response to receiving the memory instruction at a memory controller.

15. The network device of claim 13, wherein:
    the memory instruction further includes the inter-packet gap threshold.

16. The network device of claim 13, wherein:
    the inter-packet gap threshold is based on a maximum latency between the multiple paths.

17. The network device of claim 13, wherein:
    the memory controller further configured to select the inter-packet gap threshold based on a network application, wherein the network application includes one of a fabric switch, link aggregation (LAG), and equal cost multipath (ECMP).

18. The network device of claim 13, wherein:
the memory controller further configured to determine the selected path based at least in part on bandwidth utilization of the multiple paths.

19. The network device of claim 13, wherein:
the memory controller further configured to, in response to determining that the elapsed time is less than the inter-packet gap threshold:
  retain, in the flow record, a previously selected path value indicative of the previously selected path; and
  provide the previously selected path value to the processing thread for transmitting the packet over the previously selected path associated with the previous packet.

20. The network device of claim 13, wherein:
the memory controller further configured to, in response to determining that the elapsed time is greater than the inter-packet gap threshold:
  update the flow record by replacing the previously selected path value with the path value of the selected path of the memory instruction; and
  provide the path value of the selected path to the processing thread for transmitting the packet over the selected path.

21. The network device of claim 20, wherein:
the memory controller further configured to execute an atomic memory operation at the flow record address to determine the elapsed time and to update the flow record in a single operation.

22. The network device of claim 21, wherein:
atomic memory operation is invoked with content of the memory instruction including the flow address record, the selected path, and the inter-packet gap threshold.

23. The network device of claim 20, wherein:
the memory controller further configured to update the flow record by changing the timestamp to the current time.

24. The network device of claim 23, wherein:
the memory controller further configured to provide an updated flow record to the processing thread, wherein a path field of the updated flow record instructs the processing thread whether to use the selected path for transmitting the packet.

25. An apparatus, comprising:
at least one processor; and
at least one memory storing instructions which, when executed by the at least one processor, cause the apparatus to at least:
  receive a packet at a processing thread;
  perform a lookup function for the packet to determine a selected path among the plurality of paths to which the packet is to be transmitted;
  perform a hash function for the packet to determine a flow record address for the packet;
  issue a memory instruction to a memory controller, the memory instruction including the flow record address and a path value indicating the selected path;
  obtain a current time associated with the packet;
  access a flow record according to the flow record address to retrieve a timestamp of a previous packet;
  determine an elapsed time between the packet and the previous packet based on a difference between the current time and the timestamp; and
  determine, based on a comparison of the elapsed time and an inter-packet gap threshold, whether to transmit the packet over the selected path or a previously selected path associated with the previous packet.

* * * * *